Sept. 11, 1951 R. R. LA TORRE 2,567,217
HYDRAULIC RECORDING MECHANISM
Filed Feb. 28, 1949 2 Sheets-Sheet 1
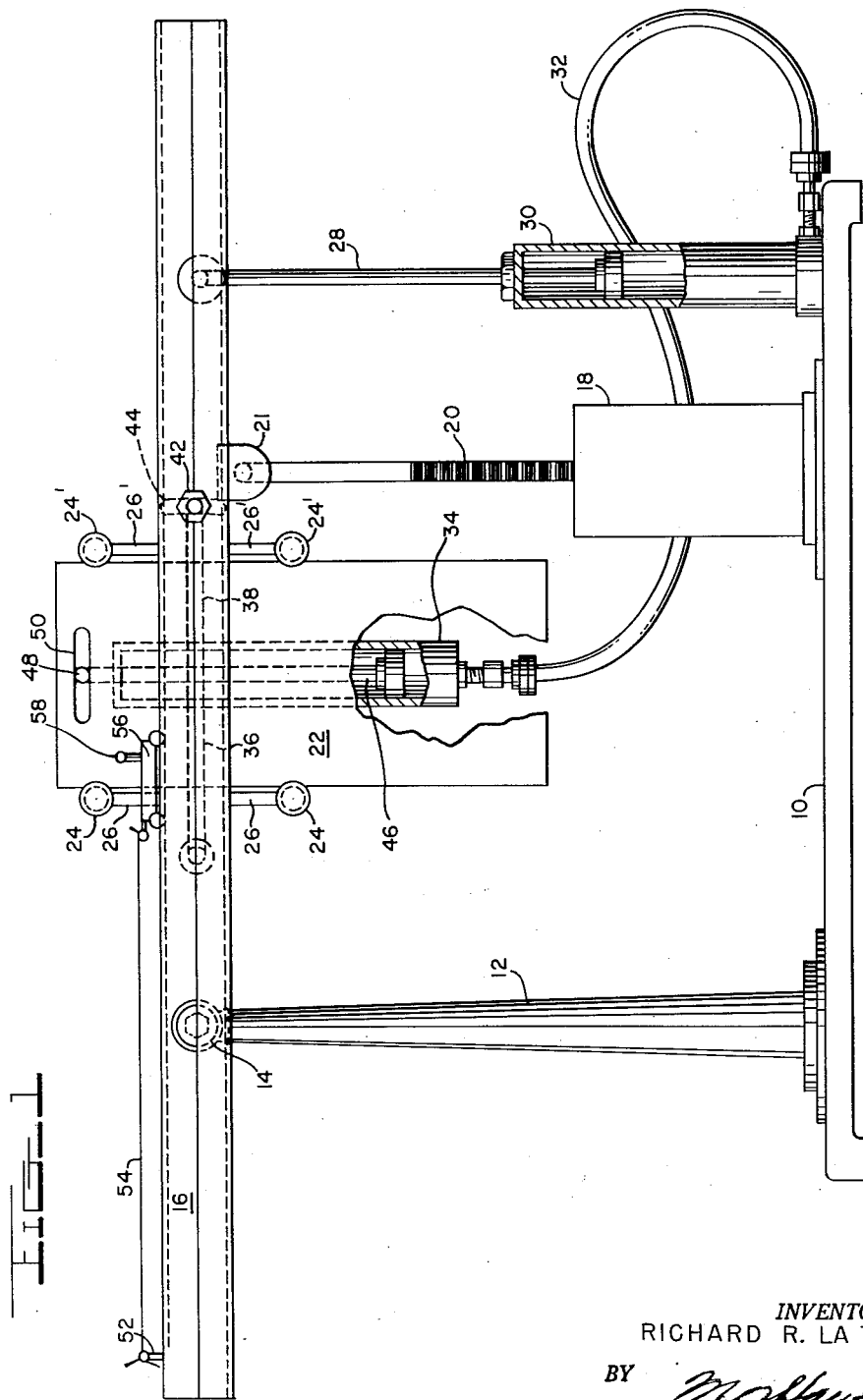
INVENTOR.
RICHARD R. LA TORRE
BY
ATTORNEY

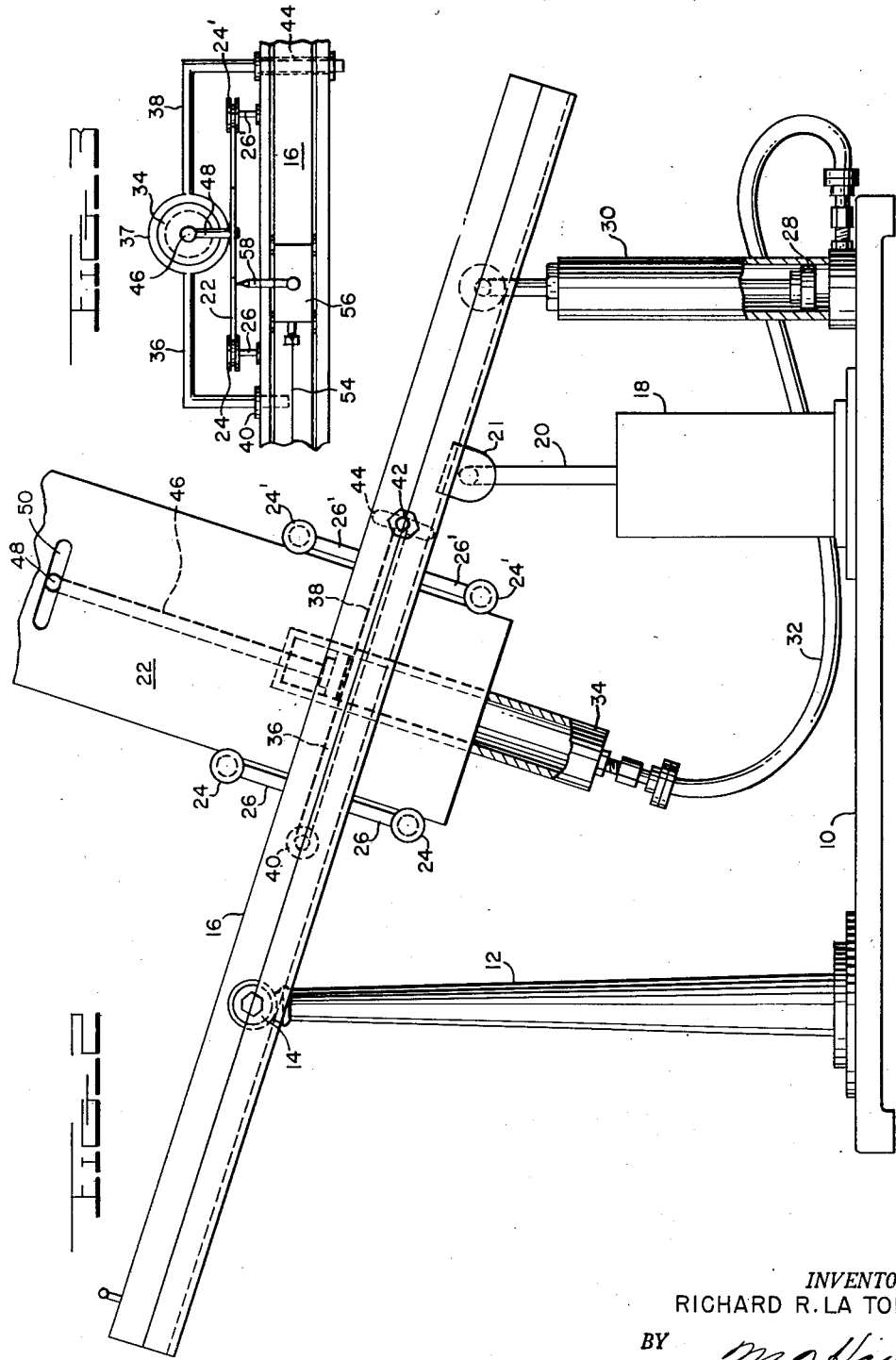

Patented Sept. 11, 1951

2,567,217

UNITED STATES PATENT OFFICE 2,567,217

HYDRAULIC RECORDING MECHANISM

Richard R. La Torre, Washington, D. C.

Application February 28, 1949, Serial No. 78,880

2 Claims. (Cl. 73—89)

(Granted under the act of March 3, 1883, as amended April 30, 1928; 370 O. G. 757)

This invention relates to tensile testing machines and particularly to load-elongation recording means used in inclined-plane type tensile testing machines.

The inclined-plane tensile machine (IP machines) are commonly used in studying the tensile properties of strand materials such as textile fibers, yarns, threads, etc. A typical IP machine is that shown in U. S. Patent 2,286,651, issued June 16, 1942 to Scott. In the operation of this kind of machine a fiber specimen is first mounted horizontally by securing it at one end to a fixed post mounted on a horizontal but inclinable track and at the other end to a weighted roller adapted to roll on said track. The track is then gradually inclined and the specimen is tensioned as the roller rolls down the track under the force of gravity.

As regards measuring and recording the elongation of the specimen, it is clear that a marking means rigidly mounted on the roller and held against a chart or other record-receiving means fixed relative to the rolling direction of the roller constitutes a very satisfactory apparatus for recording elongation. A pen or pencil mounted on the roller and held against a chart paper disposed on a plate mounted on the inclinable track is commonly used and provides a direct, recorded measure of elongation. As regards measuring and recording the force or load on the specimen, and particularly recording the loads as a plot against elongation, the problem is not so simple. It is apparent that if load is to be plotted simultaneously against elongation the chart paper on which the latter is recorded must be made to move perpendicular to the moving direction of the elongation indicator (roller) and therefore perpendicular to the inclinable track. Further, if the load is to be accurately plotted rectilinearly, the chart must move exactly proportionally to the increase in load.

Due to the fact that the load (neglecting friction) is at any instant directly proportional to the sine of the angle of inclination, this chart movement may be brought about by an appropriate kinematic relation with the table movement. Several mechanisms have been devised to set up such a relationship.

Thus, the Scott patent referred to above shows a cam follower mounted on the chart-holding plate and constrained against a fixed concave cam surface said follower imparting motion to the plate as the table inclines. The plate is held laterally by roller elements disposed on each side thereof to permit motion (due to the cam action) perpendicular to the table only. This arrangement affords a continuous plot of load versus elongation. Of course the actual load will also depend on the weight of the roller, but this is a constant factor and can be taken care of by use of an appropriate load scale. By proper design of the cam surface a movement of the chart may be brought about which is approximately proportional to the load, but since the machine is not susceptible to known methods of mathematical analysis the proper equation for this surface is not determinable and the design must be empirical, and thus only approximately correct.

The most commonly used mechanism is a cord-and-pully arrangement wherein a cord attached to a fixed point at the base of the machine and running over pulleys mounted on the inclinable track is attached to the chart-holding plate and pulls the chart perpendicularly to the track as the track is inclined.

Over given small increment the movement of the chart will be equal to the movement of the angular movement (change in sine of angle of inclination) of the track and therefore the increase in load. However, as the inclined position of the track changes, a systematic error is introduced which makes the movement of the chart slightly non-linear with respect to load and thus recorded load readings are correspondingly inaccurate.

The cause of this error and an improved pully system to partially overcome it are discussed in an article by S. L. Gerhard, Rayon Textile Monthly, May 1943, page 49 (237).

It is the general object of this invention to provide an inclined-plane tensile testing machine which will yield a record of the applied load without kinematic error.

It is another object to provide such a machine which will not require any pulleys, cords or cams for its operation.

It is a further object to provide such a machine wherein the movement of the chart as a function of the movement of the track will be independent of the angular position of the track.

It is the particular object to provide a load recording chart in such a machine which will move at all time perpendicular to the inclined track and exactly proportional to the change in sine of the angle of inclination.

Other objects and advantages will be apparent from the following description of the invention.

This invention comprises an IP tensile testing machine wherein the load recording chart is actuated by a hydraulic or fluid pressure system which is in turn actuated by the tilting movement of the inclinable track.

A preferred embodiment of the invention is shown in the accompanying drawings.

Figure 1 is a schematic elevation view of an IP-type machine embodying this invention.

Figure 2 is a similar view of the machine in the inclined position and showing the relative change in position of the respective parts of the apparatus during testing.

Figure 3 is a plan view of the chart-plate and actuating means assembly showing also the roller and marking means.

Figures 1 and 2 show the machine to be constructed on a conventional base 10. An upright member 12 supports table 16 which is mounted to pivot in a vertical plane thereon at 14. Table 16 is also supported by driving rack 20 attached to said table through sliding means 21 adapted to slide therein. Rack 20 is in responsive relation with conventional driving means 18 which preferably comprises an electric motor and appropriate gearing means adapted to produce a desired rate of inclination, and thus of loading.

Chart-plate 22 is conventionally disposed between two pairs of rollers 24 and 24' which are mounted in rigid relation with table 16 through brackets 26 and 26'. Thus chart-plate 22 is rigidly disposed with respect to movement in the direction of the axis of table 16 (thereby insuring accurate, linear recording of elongation), while being freely movable in a direction perpendicular thereto. It is pointed out the requirement that the chart move perpendicularly only with respect to the table is stated merely because it is assumed that a direct rectilinear record of elongation will always be desired. If such should not be the case, brackets 26 and 26' can be tilted. The recorded data will then require appropriate mathematical interpretation.

Adapted to be driven vertically by the inclining motion of table 16, is piston rod 28 which is in conventional piston-and-cylinder relation with cylinder 30. The cylinder 30, as well as hydraulic flexible tubing 32, contains hydraulic fluid of any suitable kind and is in hydraulic relation with cylinder 34. Cylinder 34 is rigidly but adjustably mounted with respect to table 16 by means of brackets 36 and 38 and collar 37. See also Figure 3 at this point. Bracket 36 is pivotally mounted on table 16 at pivot point 40 and bracket 38, passing through slit 44, is rigidly secured to table 16 by locking means 42, the position bracket 38 in slit 44 being variable, however. By adjusting the position of bracket 38 in slit 44 the direction of cylinder 34 may be varied from the perpendicular. Disposed in piston-and-cylinder relation with cylinder 34 is piston 46 the piston rod of which extends to a point near the upper edge of chart-plate 22 at which point it is engaged with said plate through bracket rod or pin 48 slidable in a transverse slot 50 in said plate.

An upright post 52 for securing the specimen 54 is disposed in an adjustable position near an end of table 16. The specimen is secured to roller 56 through similar conventional fastening means. Roller 56 is equipped with marking means 58 mounted horizontally thereon and held against chart-plate 22. The roller and specimen are shown in Figures 1 and 3, but are omitted from Figure 2 for clarity.

The mechanism of operation of the invention is easily understood from consideration of Figures 1 and 2. Thus, as the load is applied through inclination of table 16 caused by actuation of driving rack 20, the piston 28 is driven down into cylinder 30, and correspondingly piston 46 is driven up in cylinder 34. Due to the kinematic relation between piston 46 and chart-plate 22 the latter is moved a distance equal or proportional to the movement of the former depending on whether cylinder 34 is perpendicular or tilted with respect to table 16. Thus, the movement of the chart-plate is exactly proportional to the sine of the angle of inclination, and neglecting friction, is exactly proportional to the applied load. It is of course, essential that there by no "leakage" of hydraulic fluid. More generally, the one piston must be linearly responsive to the movement of the other for maximum accuracy. This condition is attained by expeditious use of seals, washers, etc., as has been developed to a high degree by the hydraulic pressure art. It is not essential that the cylinders 34 and 30 be of same diameter since the movement of chart must be only proportional to the sine of the inclination. In fact, the proportionality constant can be drastically changed by changing the ratio of cylinder diameters. It is, of course, much easier to change the proportionality constant by tilting cylinder 34 as explained above. It will be apparent that this constant may be changed in the opposite direction by tilting cylinder 30. The possibility of varying the proportionality constant as described above makes possible adjustment of the machine to give "full scale deflection" for small loads, and conversely, to permit the recording of large loads fully within the chart without increasing the weight of the roller excessively. This last point is important since it is always desirable to obtain applied load by greater inclination rather than greater roller weight due to the inherent friction error.

Other embodiments of this invention will be apparent to those skilled in the art. For example, piston and cylinder 46 and 34 can be inverted and chart-plate 22 driven down instead of up. This would automatically result in plotting load as a positive ordinate rather than a negative, if such should be desirable.

Other modifications and variations will be apparent to those skilled in the art and the above examples are purely illustrative. The invention is to be limited only as defined by the herewith appended claims.

The invention described herein may be manufactured and used by or for the Government of the United States of America for governmental purposes without the payment of any royalties thereon or therefor.

What is claimed is:

1. In a recording, testing machine for testing and recording tensil strength and load-elongation, of the type utilizing a tiltable track, weighted carriage and chart platen constrained to move transversely of the track, in the plane of tilt; means for moving the chart platen in lineal proportion to the sine of the angle of tilt comprising a vertically positioned primary hydraulic cylinder and displacement piston therefor, said piston being constrained to move vertically by the tilting motion of the tiltable track whereby to vary the volume of the cylinder in direct proportion to the sine of the angle of tilt of the track, a secondary hydraulic cylinder and piston rod therefor fixed relative to the track with the piston constrained to move perpendicularly to the track in the plane of tilt, means connecting said piston rod with the chart platen for imparting movement to the latter from the rod and a flexible conduit connecting the interiors of said hydraulic cylinders.

2. A recording, testing machine as claimed in claim 1, in which the secondary cylinder is adjustably tiltable in the plane of tilt of the track independently of the platen and connection between the chart platen and the piston rod of said secondary cylinder comprises a slot and pin connection with the slot situated in the platen and extending perpendicularly to the said constrained direction of movement of the platen and in the plane of tilt of the track so as to transmit to the platen only that component of the piston rod movement which is parallel to the direction of movement to which the platen is constrained.

RICHARD R. LA TORRE.

REFERENCES CITED

The following references are of record in the file of this patent:

UNITED STATES PATENTS

| Number | Name | Date |
| --- | --- | --- |
| 1,925,000 | Mullins | Aug. 29, 1933 |
| 2,205,579 | Scott | June 25, 1940 |
| 2,286,651 | Scott | June 16, 1942 |
| 2,442,150 | Scott | May 25, 1948 |